(12) United States Patent
Gao et al.

(10) Patent No.: US 12,519,592 B2
(45) Date of Patent: Jan. 6, 2026

(54) REFERENCE SIGNAL RESOURCE MANAGEMENT FOR FAST PANEL SWITCHING AND ANTENNA SWITCHING

(71) Applicant: ZTE Corporation, Guangdong (CN)

(72) Inventors: Bo Gao, Guangdong (CN); Zhaohua Lu, Guangdong (CN); Yu Ngok Li, Guangdong (CN); Ke Yao, Guangdong (CN); Shujuan Zhang, Guangdong (CN); Hao Wu, Guangdong (CN)

(73) Assignee: ZTE Corporation, Shenzhen (CN)

(*) Notice: Subject to any disclaimer, the term of this patent is extended or adjusted under 35 U.S.C. 154(b) by 224 days.

(21) Appl. No.: 17/866,093

(22) Filed: Jul. 15, 2022

(65) Prior Publication Data

US 2022/0353042 A1 Nov. 3, 2022

Related U.S. Application Data

(63) Continuation of application No. PCT/CN2020/088133, filed on Apr. 30, 2020.

(51) Int. Cl.
*H04L 5/00* (2006.01)
*H04W 16/28* (2009.01)

(52) U.S. Cl.
CPC .......... *H04L 5/0051* (2013.01); *H04L 5/0048* (2013.01); *H04L 5/0057* (2013.01); *H04W 16/28* (2013.01)

(58) Field of Classification Search
None
See application file for complete search history.

(56) References Cited

U.S. PATENT DOCUMENTS

| 2019/0260456 | A1* | 8/2019 | Zhou | H04B 7/0877 |
| 2020/0067676 | A1 | 2/2020 | Yi | |
| 2020/0404593 | A1 | 12/2020 | Yao et al. | |
| 2021/0167821 | A1* | 6/2021 | Chen | H04B 7/0404 |
| 2022/0015118 | A1* | 1/2022 | Park | H04W 72/20 |
| 2022/0166587 | A1* | 5/2022 | Go | H04L 5/0048 |
| 2022/0217654 | A1* | 7/2022 | Kang | H04W 52/14 |

(Continued)

FOREIGN PATENT DOCUMENTS

| CN | 106793068 A | 5/2017 |
| CN | 109257153 A | 1/2019 |

(Continued)

OTHER PUBLICATIONS

Examination Report for Australian Patent Application No. 2020397127, mailed Mar. 7, 2023 (3 pages).

(Continued)

*Primary Examiner* — Christopher M Crutchfield
(74) *Attorney, Agent, or Firm* — Perkins Coie LLP

(57) ABSTRACT

Methods, apparatus, and systems for reference signal resource management to enable fast panel switching and antenna switching for wireless devices that have multiple panels are disclosed. In one example aspect, a wireless communication method includes receiving, by a wireless device, a configuration parameter from a base station. The method also includes transmitting, by the wireless device, a sounding reference signal (SRS) to the base station according to an SRS procedure in which one or more resource sets are determined according to the configuration parameter.

12 Claims, 14 Drawing Sheets

(56) References Cited

U.S. PATENT DOCUMENTS

| | | | | |
|---|---|---|---|---|
| 2022/0304018 | A1* | 9/2022 | Ko | H04W 74/0833 |
| 2022/0352935 | A1* | 11/2022 | Liu | H04B 7/0456 |
| 2023/0093299 | A1* | 3/2023 | Yoshimura | H04L 5/0082 370/329 |
| 2023/0143852 | A1* | 5/2023 | Yu | H04B 7/0404 370/329 |

FOREIGN PATENT DOCUMENTS

| | | |
|---|---|---|
| CN | 109587792 A | 4/2019 |
| CN | 109803362 A | 5/2019 |
| CN | 110536456 A | 12/2019 |
| CN | 110912665 A | 3/2020 |
| JP | 2020-038493 * | 6/2020 |
| WO | 2018203650 A1 | 11/2018 |
| WO | 2018203653 A1 | 11/2018 |
| WO | 2019/217891 A1 | 11/2019 |

OTHER PUBLICATIONS

Huawei et al., "Remaining issues on SRS configuration," 3GPP TSG-RAN WG2 eMeeting #109, Electronic, R2-2000967, 4 pages, Feb. 24-Mar. 6, 2020.

Zte, "Further discussion on NR SRS carrier switching RRM requirements," 3GPP TSG-RAN WG4 Meeting #94-e, Online, R4-2001275, 5 pages, Feb. 24-Mar. 6, 2020.

International Search Report and Written Opinion for International Application No. PCT/CN2020/088133, mailed on Jan. 26, 2021 (6 pages).

LG Electronics, "Outcome of email thread [100e-NR-eMIMO-MB-03]," 3GPP TSG RAN WG1 #100, e-Meeting, R1-2001261, 9 pages, Feb. 24-Mar. 6, 2020.

LG Electronics, "Summary of discussion topic C on Rel-16 MB1," 3GPP TSG RAN WG1 #100, e-Meeting, R1-2001174, 5 pages, Feb. 24-Mar. 6, 2020.

Qualcomm Incorporated, "Discussion," 3GPP TSG RAN WG1 Meeting #100-e, R1-2000984, 79 pages, Feb. 24-Mar. 6, 2020.

AT&T et al., "RAN1 UE features list for Rel-16 NR," 3GPP TSG RAN WG1 #100, e-Meeting, R1-2000930, 157 pages, Feb. 24-Mar. 6, 2020.

LG Electronics, "Text proposals on multi beam operation," 3GPP TSG RAN WG1 #100, e-Meeting, R1-2000680, 9 pages, Feb. 24-Mar. 6, 2020.

Oppo, "Remaining Issues on UL Positioning Reference Signal," 3GPP TSG RAN WG1 #100, e-Meeting, R1-2000463, 4 pages, Feb. 24-Mar. 6, 2020.

Oppo, "Remaining Issues on Multi-beam Operation Enhancement," 3GPP TSG RAN WG1 #100, e-Meeting, R1-2000458, 8 pages, Feb. 24-Mar. 6, 2020.

Vivo, "On Rel-16 UE features," 3GPP TSG RAN WG1 #100, e-Meeting, R1-2000351, 32 pages, Feb. 24-Mar. 6, 2020.

Vivo, "Discussion on remaining issues on Multi-Beam and text proposals," 3GPP TSG RAN WG1 #100, e-Meeting, R1-2000334, 7 pages, Feb. 24-Mar. 6, 2020.

Zte, "Maintenance of enhancements on multi-beam operation," 3GPP TSG RAN WG1 #100, e-Meeting, R1-2000240, 9 pages, Feb. 24-Mar. 6, 2020.

Huawei et al., "On SRS antenna switching,"3GPP TSG-RAN WG4 Meeting #90, R4-1901596, Athens, Greece, Feb 25-Mar. 1, 2019.

Huawei et al., "On SRS antenna switching for FR2,"3GPP TSG-RAN WG4 Meeting #90bis, R4-1904521, Xi'an, China, Apr. 8-12, 2019.

Huawei et al., "Consideration on handling SRS antenna switching requirement in Rel-16,"3GPP TSG-RAN WG4 Meeting #91, R4-1906868, Reno, USA, May 13-17, 2019.

Extended European Search Report for European Patent Application No. 20894955.2, mailed Jul. 10, 2023 (11 pages).

Examination Report for Australian Patent Application No. 2020397127, mailed Aug. 22, 2023 (4 pages).

IP Australia, Notice of Acceptance for Australian Application No. 2020397127, mailed on Mar. 7, 2024, 3 pages.

IPOS, Written Opinion for Singaporean Application No. 11202251314K, mailed on Nov. 26, 2024, 8 pages.

CNIPA, First Office Action for Chinese Application No. 2020801003161, mailed on Aug. 27, 2024, 36 pages with unofficial English translation.

Intel Corporation, "On SRS Antenna Switching in FR2," 3GPP TSG RAN WG4 #90Bis, Xi' An, China, R4-1903123, Apr. 8-12, 2019, 6 pages.

CNIPA, Second Office Action for Chinese Application No. 202080100316.1, mailed on Apr. 9, 2025, 10 pages with unofficial English translation.

Ericsson, "Comparison of MAC CE signalling options for spatial relation update of aperiodic SRS," 3GPP TSG-RAN WG1 Meeting #97, Reno, USA, R1-1907473, May 13-17, 2019, 5 pages.

IMPI, Office Action for Mexican Application No. MX/a/2022/008815, mailed on Sep. 5, 2025, 8 pages with unofficial English translation.

CNIPA, Notification to Complete Formalities of Registration for Chinese Application No. 2020801003161, mailed on Jul. 1, 2025, 4 pages with unofficial English translation.

IPOS, Notice for Eligibility of Grant for Singaporean Application No. 11202251314K, mailed on Jul. 28, 2025, 4 pages.

* cited by examiner

REFERENCE SIGNAL RESOURCE MANAGEMENT FOR FAST PANEL SWITCHING AND ANTENNA SWITCHING

CROSS REFERENCE TO RELATED APPLICATIONS

This patent document is a continuation of and claims benefit of priority to International Patent Application No. PCT/CN2020/088133, filed on Apr. 30, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques related to reference signal resource management to enable fast panel switching and antenna switching for wireless devices that have multiple panels (e.g., transmission/reception entities).

In one example aspect, a wireless communication method is disclosed. The method includes receiving, by a wireless device, a configuration parameter from a base station. The method also includes transmitting, by the wireless device, a sounding reference signal (SRS) to the base station according to an SRS procedure in which one or more resource sets are determined according to the configuration parameter.

In another example aspect, a wireless communication method is disclosed. The method includes transmitting, by a base station, a configuration parameter to a wireless device. The method also includes receiving, by the base station, a sounding reference signal (SRS) to the base station according to an SRS procedure in which one or more resource sets are determined according to the configuration parameter.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The use of wide or ultra-wide spectrum resources, e.g., up to 20 MHz channels, for high frequency communications has become prevalent with the advancement of wireless communication technology. Considerable propagation loss induced by the extremely high frequency now becomes a noticeable challenge. To address this problem, antenna array and beamforming training technologies based on massive Multiple-In-Multiple-Out (MIMO) techniques, e.g., using up to 1024 antenna elements for one communication node, have been adopted to achieve beam alignment and obtain sufficiently high antenna gain.

Figure 1:
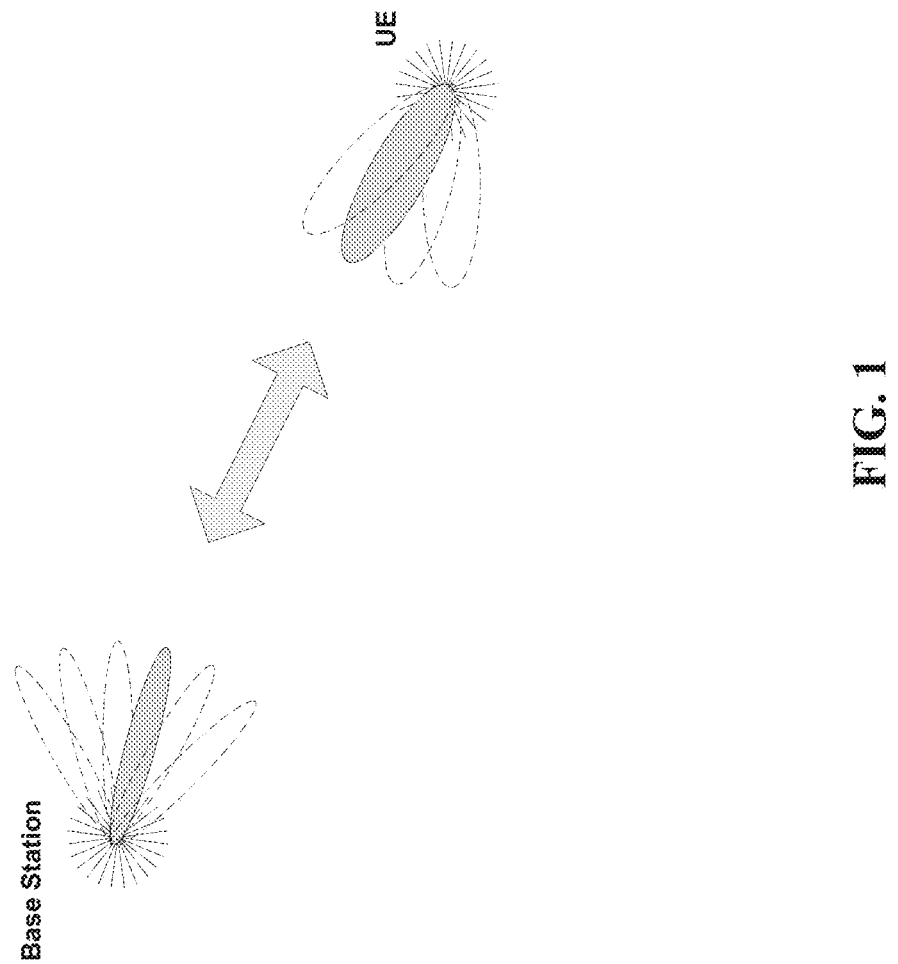
FIG. 1 illustrates an example of beamforming training process in a one-Transmission/Reception Point (TRP) and one-panel scenario.

Due to the low implementation cost, analog phase shifters have been widely used for implementing mm-Wave beamforming. The number of controllable phases is finite and the constant modulus constraints are placed on the antenna elements. Given pre-specified beam patterns, beamforming training identifies the best pattern for subsequent data transmissions. Current communication systems are designed for scenarios in which there is only a single panel in the User Equipment (UE). That is, the UE has a single antenna group, antenna port group, beam group, sub-array, transmission entity/unit, or reception entity/unit. FIG. 1 illustrates an example of beamforming training process 100 in a one-Transmission/Reception Point (TRP) and one-panel scenario. As shown in FIG. 1, only one downlink or uplink transmission beam can be received or transmitted by the UE at a given time.

In 5G New-Radio (NR) communication systems, beamforming is indicated in both downlink (DL) and uplink (UL) transmission. Such indication is also referred to as beam indication. For UL transmissions, spatial relation information (e.g., spatialRelationInfo) was introduced to support beam indication for UL control channel, e.g., physical uplink control channel (PUCCH) and sounding reference signal (SRS). Beam indication for UL data channel, e.g., physical uplink shared channel (PUSCH), is achieved through mapping between one or more SRS resources and antenna ports of the UL data channel. Thus, beam configuration for UL data channel can be derived from the spatial relation information and the association/mapping information between the SRS resources and its antenna ports.

Within a UE panel, antenna switching is performed for Channel State Information (CSI) acquisition via SRS transmissions according to channel reciprocity. The current UE antenna switching mechanism is also designed for a single active panel, which means that the SRS resources for antenna switching have the same spatial relation, e.g., based on only one uplink beam and/or only one UE panel.

Figure 2:
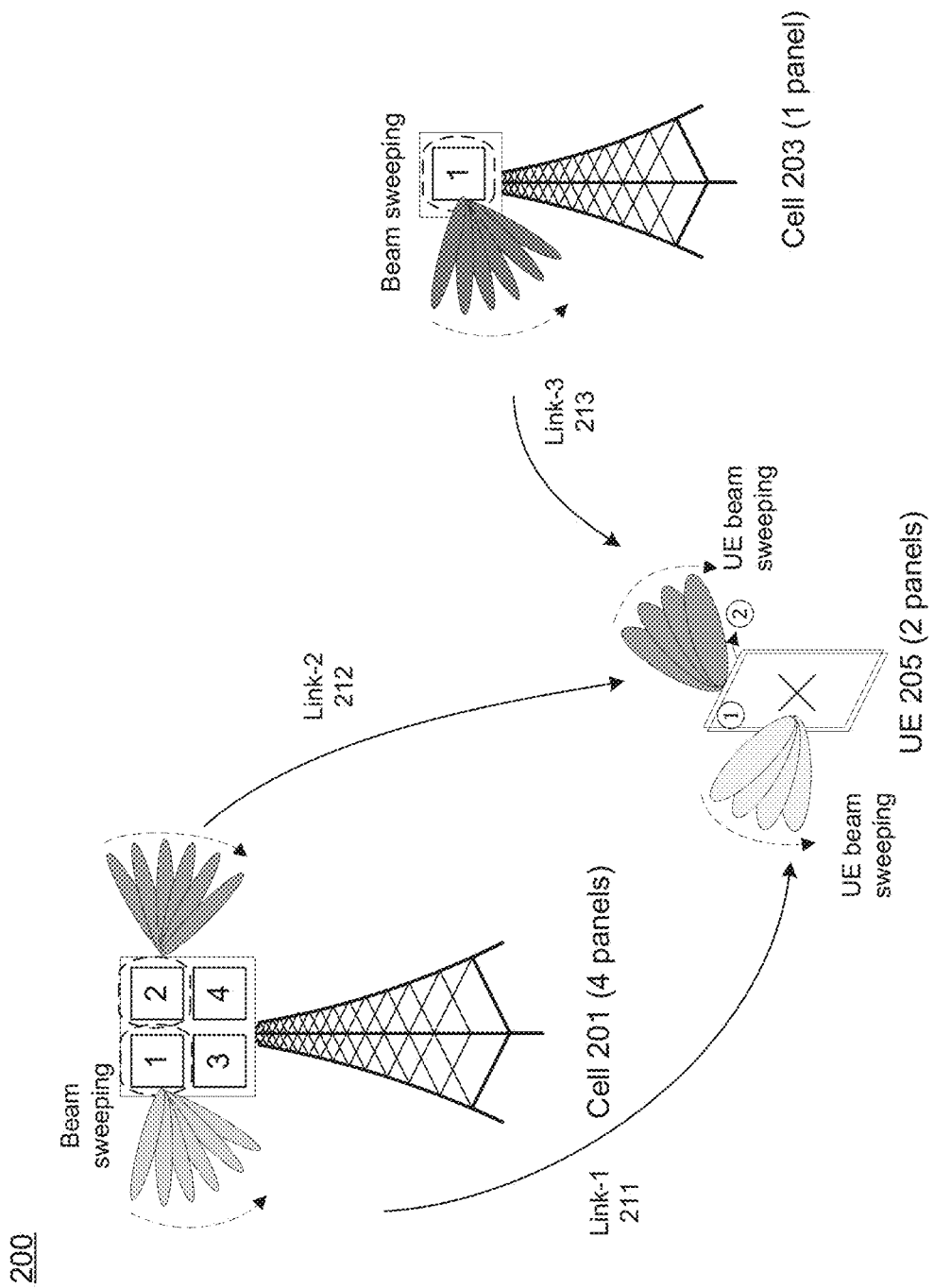
FIG. 2 illustrates an example of multi-panel transmission in a multiple TRP scenario.

FIG. 2 illustrates an example of multi-panel transmission 200 in a multiple TRP scenario. A first cell 201 has four panels. The first cell 201 can perform beam sweeping for each of its panels. A second cell 203 has only one panel. A UE 205 that is in communication with both cells 201, 203 has two panels. The UE can similarly perform beam sweeping for each of its panel. Multiple communication links can be established between the UE and the base stations. For example, the UE maintains two communication links 211, 212 with the first cell 201, and a single communication link 213 with the second cell 203. There can be multiple active DL panel but a single active UL panel at a given time. Currently, when the UE has multiple panels, as shown in FIG. 2, how the UE activates or deactivates its panels is not well defined.

The Sounding Reference Signal (SRS) is a reference signal transmitted by the UE towards the network (e.g., in the uplink direction) that is used by the base station to estimate the uplink channel characteristics over a bandwidth. The base station may use this information for uplink frequency selective scheduling. A sounding reference signal (SRS) procedure is in general configured by a base station. An SRS procedure can include uplink transmissions and/or measurement procedures based on SRS transmission. The UE transmits the SRS to the base station so that the base station can probe and measure the uplink channel. Considering downlink and uplink channel reciprocity, an antenna switching based on SRS procedure can also be used for DL-CSI acquisition. In this document, an antenna switching procedure also includes DL-CSI acquisition in conjunction.

Figure 3:
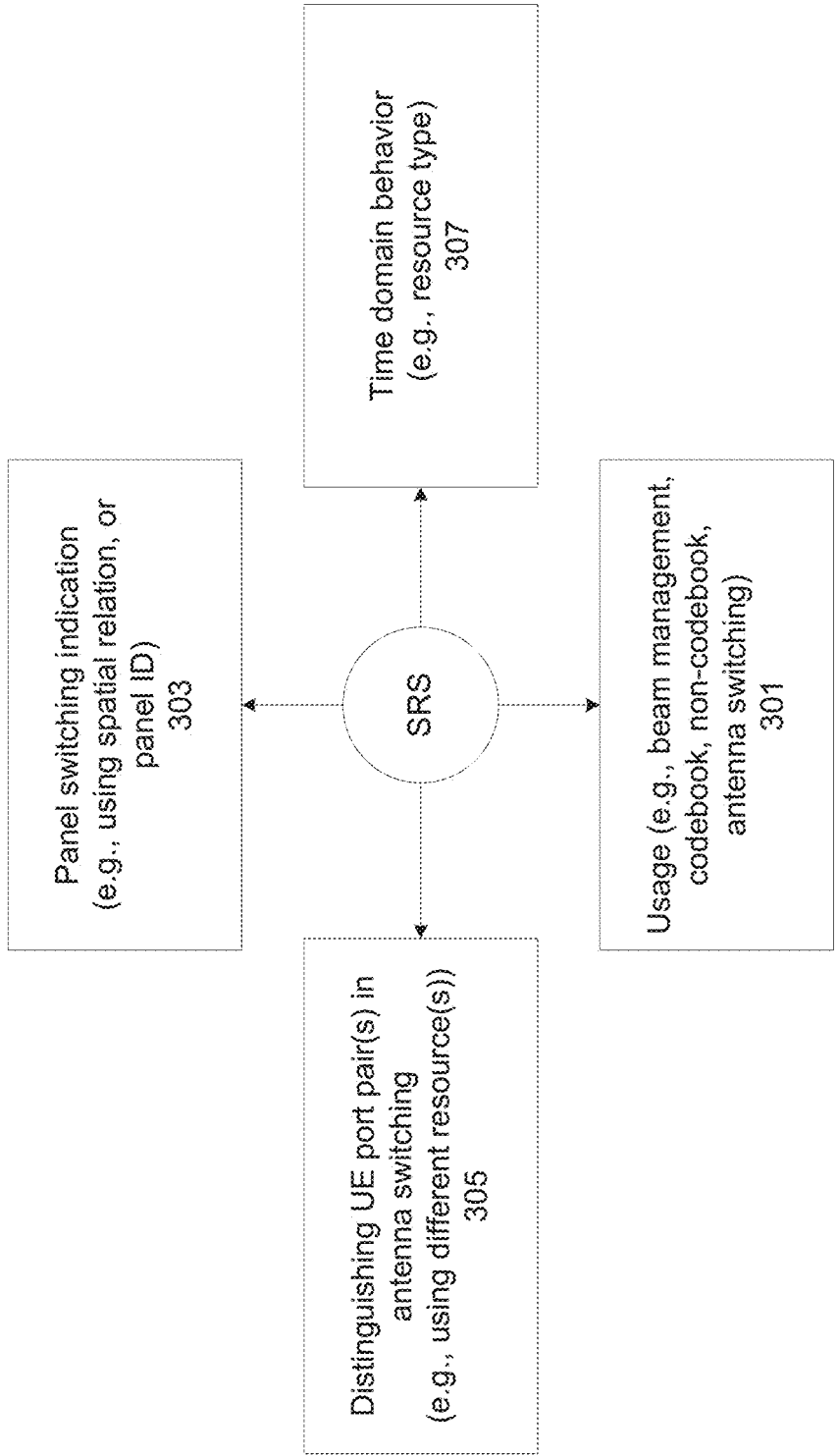
FIG. 3 illustrates an example framework for Sounding Reference Signal (SRS) transmissions in an SRS procedure in accordance with the present technology.

FIG. 3 illustrates an example framework 300 for SRS transmissions in an SRS procedure in accordance with the present technology. The configuration information from the base station can indicate at least the following:

1. The usage(s) of the SRS transmission(s) (301). An SRS transmission can have one or more usages, including but not limited to beam management, codebook transmission, non-codebook transmission, and antenna switching.

2. Panel switching (303). For example, if the UE supports multiple panels, the UE can report its capability so that the base station can indicate panel switching via spatial relations or panel identifier (ID).

3. How UE ports and/or port groups are distinguished in antenna switching (305). For example, the base station can configure different resources and/or resource sets to indicate the mapping between UE ports and/or port groups and resources.

4. The time-domain behavior of the SRS transmission (307). For example, the base station can indicate the time-domain behavior (e.g., aperiodic, semi-persistent, periodic) based on attributes such as resource type(s).

Figure 4A:
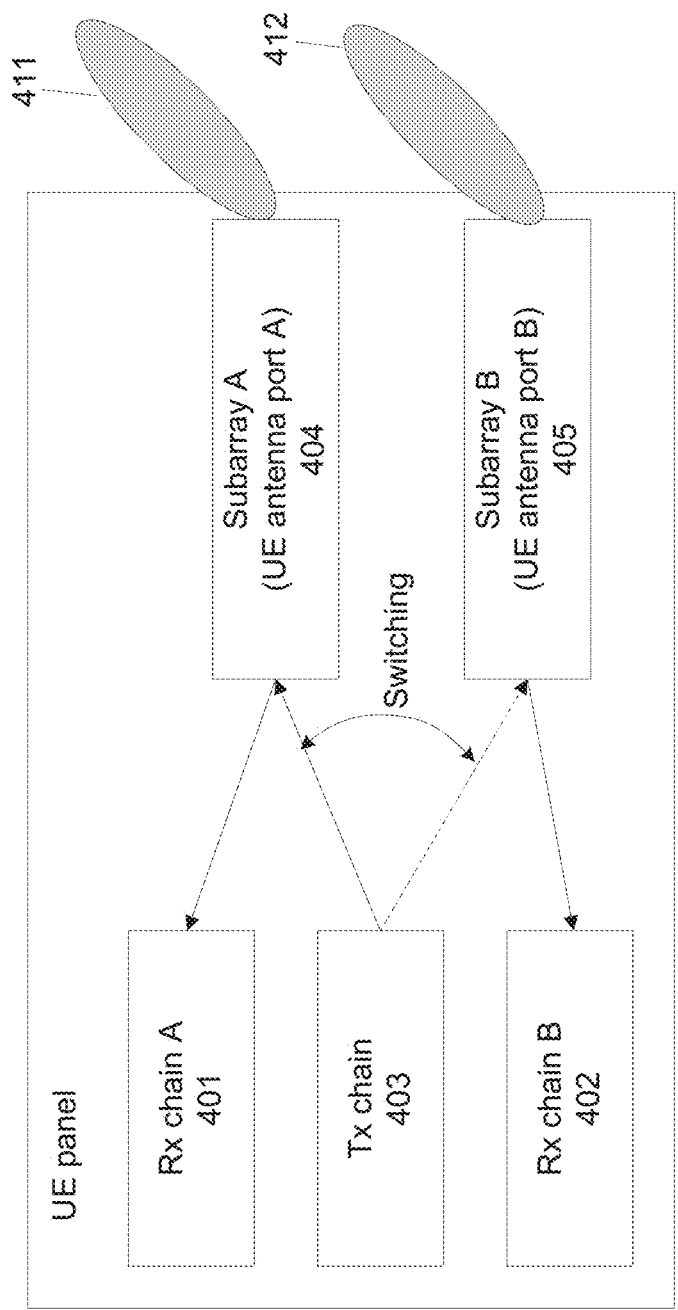
FIG. 4A illustrates an example intra-panel antenna switching scenario in accordance with the present technology.

There are two typical cases of for antenna switching: intra-panel antenna switching and inter-panel antenna switching. FIG. 4A illustrates an example intra-panel antenna switching scenario in accordance with the present technology. As shown in FIG. 4A, the UE supports two receiving (Rx) chains, Rx chain A 401 and Rx chain B 402, and a transmitting (Tx) chain Tx chain 403. The UE performs an antenna switching from antenna port A 404 to antenna port B 405 in the UE panel. In intra-panel antenna switching, the SRS transmission for different UE antenna ports can share the same UL power control parameter(s) and/or same spatial relation (e.g., two UE antenna ports 404, 405 correspond to the same positive or negative polarization). Power control parameters comprise target power, path loss or couple loss reference signal, scaling factor for path loss or couple loss, or closed loop process.

Figure 4B:
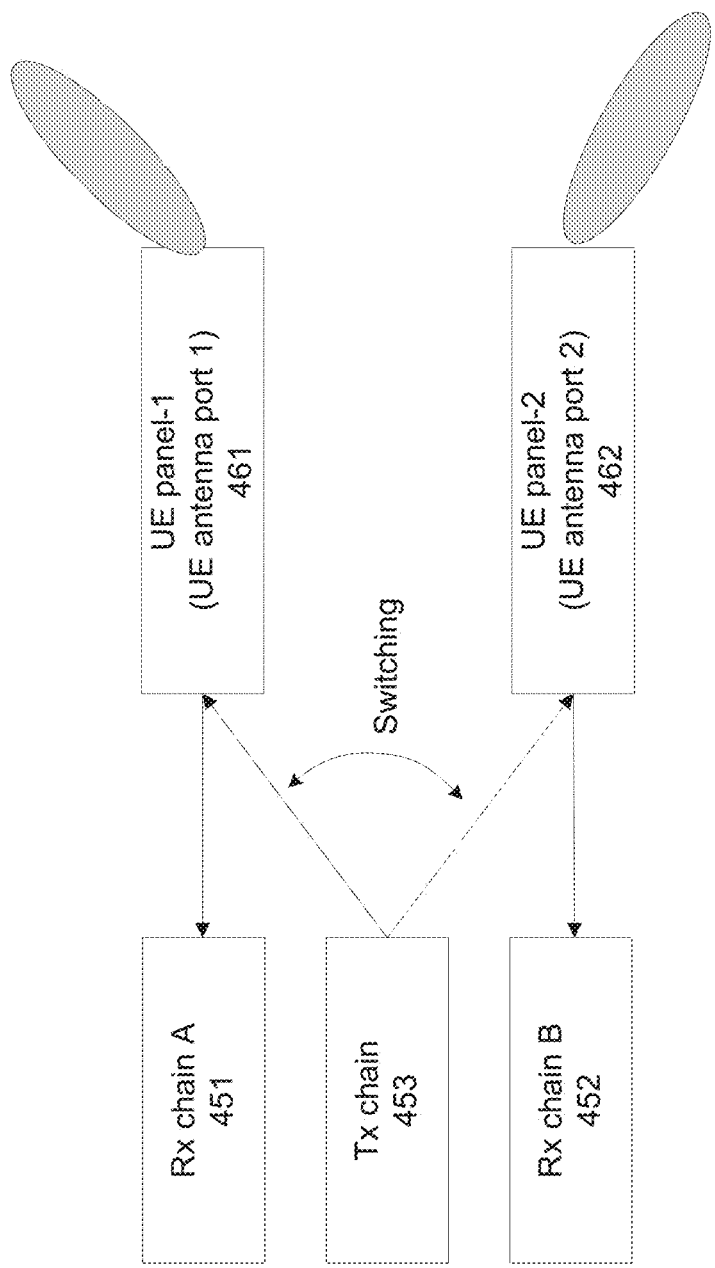
FIG. 4B illustrates an example inter-panel antenna switching scenario in accordance with the present technology.

FIG. 4B illustrates an example inter-panel antenna switching scenario in accordance with the present technology. In FIG. 4B, the UE also supports two Rx chains, Rx chain A 451 and Rx chain B 452, and a Tx chain 403. The UE has two panels 461, 462. The UE performs a panel and antenna switching from panel 461 antenna port 1 to panel 462 antenna port 2. In inter-panel antenna switching, the SRS transmission for different UE antenna ports can corresponds to different UL power control parameter(s) and/or different spatial relations, considering that each of UE panel can experience different physical channel(s).

Multiple SRS resource sets can be configured for one or more sounding procedures. From a UE perspective, it needs to recognize the association between one or more configured SRS resource sets and a sounding procedure. Besides, there can be separate requirements (e.g., time domain guard periods of intra-panel and inter-panel switching) that are determined based on UE capabilities.

Figure 5A:
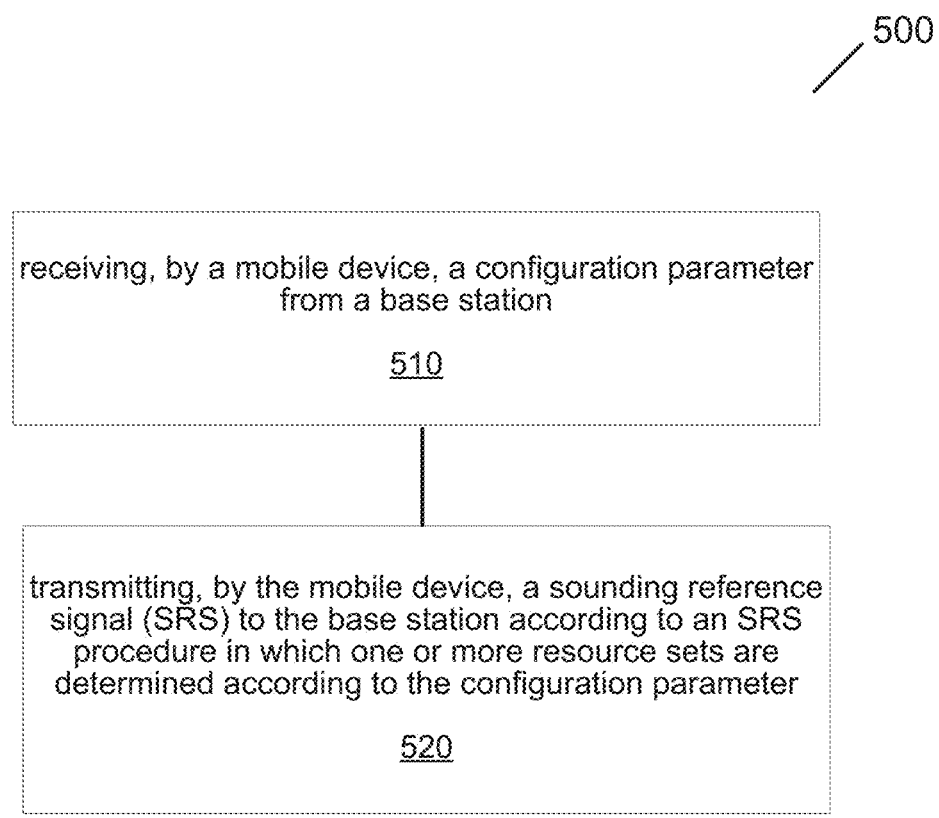
FIG. 5A is a flow chart representation of a method for wireless communication in accordance with the present technology.

This patent document discloses techniques that can be implemented in various embodiments to provide a framework for reference signal resource configuration and subsequence uplink data transmissions, thereby reducing latency for UE panel switching and increasing robustness for blockage and/or maximum power exposure (MPE) in fast UE panel switching and antenna switching. FIG. 5A is a flow chart representation of a method 500 for wireless communication in accordance with the present technology. The method 500 includes, at operation 510, receiving, by a wireless device, a configuration parameter from a base station. The method 500 also includes, at operation 520, transmitting, by the wireless device, a sounding reference signal (SRS) to the base station according to an SRS procedure in which one or more resource sets from multiple resource sets are determined according to the configuration parameter.

In some embodiments, the one or more resource sets are organized in one or more groups. In some embodiments, the one or more resource sets or resources in the one or more resource sets are associated with a same configuration parameter. In some embodiments, the configuration parameter comprises an indicator indicating an association of the one or more resource sets. In some embodiments, the configuration parameter extends to multiple parameters that indicate least one of: a time-domain behavior, a number of antenna ports corresponding to resources in each of the one or more resource sets, a number of resources in each of the one or more resource sets, a triggering state, a resource type, a bandwidth part, a component carrier, a transmission state, a spatial relation, a panel, a number of transmitting and receiving antennas, or a power control parameter.

In some embodiments, resources from different resource sets of the one or more resource sets correspond to different antenna ports or port groups of the mobile device. In some embodiments, resources from a same resource set or a same resource group of the one or more resource sets correspond to different antenna ports or port groups of the mobile device. In some embodiments, the resources correspond to a same transmission state or a same panel.

In some embodiments, the method also includes receiving, by the mobile device, a message from the base station for triggering the SRS procedure. The time-domain offset between receiving the message and transmitting the sounding reference signal is less than or equal to a first threshold. In some embodiments, resources of at least one of the one or more resource sets correspond to a same panel or a same transmission state. In some embodiments, the method includes receiving, by the mobile device, a message from the base station for triggering the SRS procedure. The time-domain offset between receiving the message and transmitting the sounding reference signal is more than or equal to a second threshold. In some embodiments, resources of at least one of the one or more resource sets correspond to different panels or different transmission states. In some embodiments, the first threshold or second threshold is configured by the base station or is determined according to a capability of the mobile device.

In some embodiments, at least one resource sets of the one or more resource sets are used for a first usage and/or a second usage. The first usage includes an antenna switching usage or a beam management usage, and the second usage includes a codebook transmission usage or a non-codebook transmission usage. In some embodiments, all resources of at least one resource sets are associated with a same panel, or a same transmission state. In some embodiments, a subset of the one or more resource sets that is positioned at a beginning or an end of the SRS transmission is applicable to an uplink data transmission, or used for the codebook transmission usage or the non-codebook transmission usage. In some embodiments, a subset of the one or more resource sets that has N lowest or highest indices is applicable to an uplink data transmission, or used for the codebook transmission usage or the non-codebook transmission usage. N is a positive integer.

In some embodiments, a guard period is applied between a first resource and a second resource. The first resource and the second resource correspond to different panels, same transmission states, and/or different resource sets, and wherein no signal is transmitted in the guard period. In some embodiments, resources in a resource set are positioned without any guard period between each other. The resources correspond to a same resource set, a same panel, and/or different transmission states. In some embodiments, a guard period is excluded between a first resource and a second resource. The first resource and the second resource correspond to a same resource set, a same panel, and/or different transmission states. In some embodiments, a guard period is excluded between a first resource and a second resource. The first resource and the second resource correspond to a different resource set.

In some embodiments, resources in at least one of the one or more resource sets correspond to a same transmission state or a same panel. In some embodiments, resources in at least one of the one or more resource sets correspond to different transmission states or different panels. In some embodiments, the resources correspond to different ports or port groups of the mobile device. In some embodiments, resources in at least one of the one or more resource sets are associated with different panels. In some embodiments, resources in at least one of the one or more resource sets are associated with a same panel. In some embodiments, a first resource in a first resource set has a same transmission state or a same panel as a corresponding second resource in a second resource set. In some embodiments, a first resource set in a first group has a same transmission state or a same panel as a corresponding second resource set in a second resource group.

In some embodiments, a capability of the mobile device indicates that resources in at least one of the one or more resource sets support different transmission states. In some embodiments, a number of different ports or port groups for the same transmission state is a predefined value or is determined based on a capability of mobile device. In some embodiments, a number of the resources that are associated with the same transmission state or the same panel is a predefined value or is determined according to a capability of the mobile device. In some embodiments, a number of the resources that are associated with different transmission states or different panels is a predefined value or determined according to a capability of the mobile device. In some embodiments, a number of the resources is determined based on an antenna indicator indicating a number of transmitting and receiving antennas.

Figure 5B:
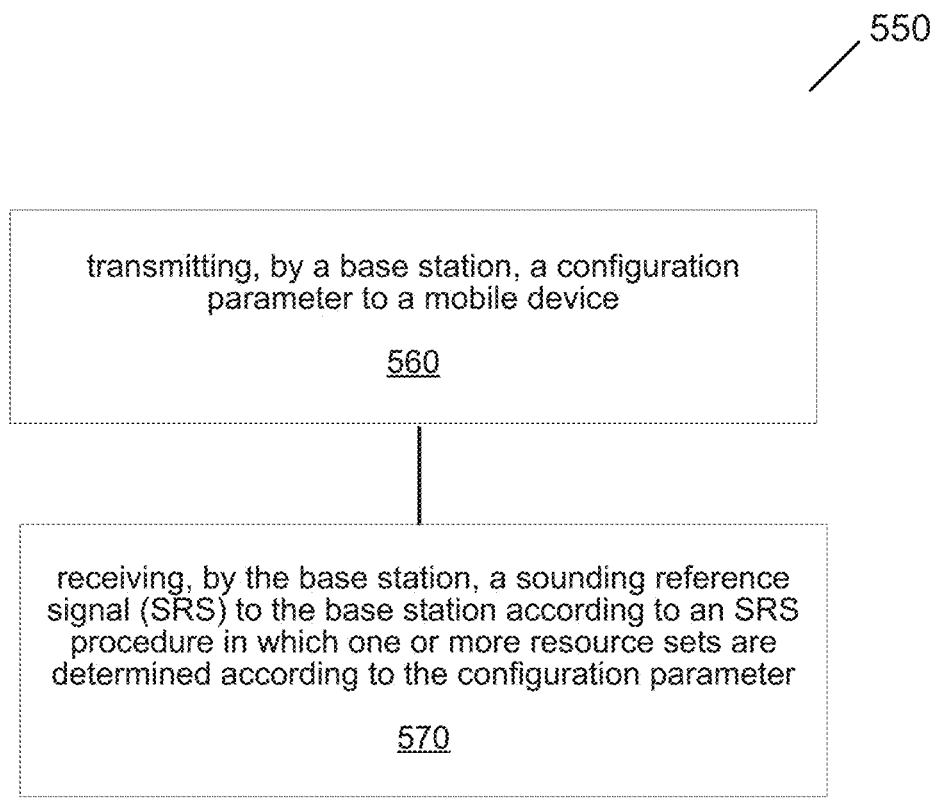
FIG. 5B is a flow chart representation of another method for wireless communication in accordance with the present technology.

FIG. 5B is a flow chart representation of a method 550 for wireless communication in accordance with the present technology. The method 550 includes, at operation 560, transmitting, by a base station, a configuration parameter to a wireless device. The method 550 also includes, at operation 570, receiving, by the base station, a sounding reference signal (SRS) to the base station according to an SRS procedure in which one or more resource sets from multiple resource sets are determined according to the configuration parameter.

In some embodiments, the one or more resource sets are organized in one or more groups. In some embodiments, the one or more resource sets or resources in the one or more resource sets are associated with a same configuration parameter. In some embodiments, the configuration parameter comprises an indicator indicating an association of the one or more resource sets. In some embodiments, the configuration parameter extends to multiple configuration parameters that indicate least one of: a time-domain behavior, a number of antenna ports corresponding to resources in each of the one or more resource sets, a number of resources in each of the one or more resource sets, a triggering state, a resource type, a bandwidth part, a component carrier, a transmission state, a spatial relation, a panel, a number of transmitting and receiving antennas, or a power control parameter.

In some embodiments, resources from different resource sets of the one or more resource sets correspond to different antenna ports or port groups of the mobile device. In some embodiments, resources from a same resource set or a same resource group of the one or more resource sets correspond to different antenna ports or port groups of the mobile device. In some embodiments, the resources correspond to a same transmission state or a same panel. In some embodiments, the method includes transmitting, by the base station, a message to the mobile device for triggering the SRS procedure. The time-domain offset between a reception of the message and a transmission of the sounding reference signal by the mobile device is less than or equal to a first threshold. In some embodiments, resources of at least one of the one or more resource sets correspond to a same panel or a same transmission state. In some embodiments, the method includes transmitting, by the base station, a message to be mobile device for triggering the SRS procedure. The time-domain offset between a reception of the message and a transmission of the sounding reference signal by the mobile device is more than or equal to a second threshold. In some embodiments, resources of at least one of the one or more resource sets correspond to different panels or different transmission states. In some embodiments, the first threshold or second threshold is configured by the base station or is determined according to a capability of the mobile device.

In some embodiments, at least one resource sets of the one or more resource sets are used for a first usage and/or a second usage. The first usage includes an antenna switching usage or a beam management usage, and the second usage includes a codebook transmission usage or a non-codebook transmission usage. In some embodiments, all resources of at least one resource sets are associated with a same panel, or a same transmission state. In some embodiments, a subset of the one or more resource sets that is positioned at a beginning or an end of the SRS transmission is applicable to an uplink data transmission, or used for the codebook transmission usage or the non-codebook transmission usage. In some embodiments, a subset of the one or more resource sets that has N lowest or highest indices is applicable to an uplink data transmission, or used for the codebook transmission usage or the non-codebook transmission usage. N is a positive integer.

In some embodiments, a guard period is applied between a first resource and a second resource. The first resource and the second resource correspond to different panels, same transmission states, and/or different resource sets, and wherein no signal is transmitted in the guard period. In some embodiments, resources in a resource set are positioned without any guard period between each other. The resources correspond to a same resource set, a same panel, and/or different transmission states. In some embodiments, a guard period is excluded between a first resource and a second resource. The first resource and the second resource correspond to a same resource set, a same panel, and/or different transmission states. In some embodiments, a guard period is excluded between a first resource and a second resource. The first resource and the second resource correspond to a different resource set.

In some embodiments, resources in at least one of the one or more resource sets correspond to a same transmission state or a same panel. In some embodiments, resources in at least one of the one or more resource sets correspond to different transmission states or different panels. In some embodiments, the resources correspond to different ports or port groups of the mobile device. In some embodiments, resources in at least one of the one or more resource sets are associated with different panels. In some embodiments, resources in at least one of the one or more resource sets are associated with a same panel. In some embodiments, a first resource in a first resource set has a same transmission state or a same panel as a corresponding second resource in a second resource set. In some embodiments, a first resource set in a first group has a same transmission state or a same panel as a corresponding second resource set in a second resource group.

In some embodiments, a capability of the mobile device indicates that resources in at least one of the one or more resource sets support different transmission states. In some embodiments, a number of different ports or port groups for the same transmission state is a predefined value or is determined based on a capability of mobile device. In some embodiments, a number of the resources that are associated with the same transmission state or the same panel is a predefined value or is determined according to a capability of the mobile device. In some embodiments, a number of the resources that are associated with different transmission states or different panels is a predefined value or determined according to a capability of the mobile device. In some embodiments, a number of the resources is determined based on an antenna indicator indicating a number of transmitting and receiving antennas.

Some examples of the disclosed techniques are further described in the following example embodiments. It is noted that transmission state includes at least one of: quasi-co-location (QCL) state, transmission configuration indicator (TCI) state, spatial relation (also referred to as spatial relation information), reference signal (RS), spatial filter, or pre-coding. A transmission state can also be referred to as a beam. A transmission state identifier (ID) includes at least one of QCL state index, TCI state index, spatial relation index, reference signal index, spatial filter index, or precoding index. Specifically, the spatial filter (also referred to as spatial-domain filter) can be at either the UE-side or the base station side, and the spatial filter is also called as spatial-domain filter. It is also noted that spatial relation information comprises one or more reference RSs that are used to represent the same spatial relation or quasi-co spatial relation between targeted reference or channel and the one or more reference signals. Spatial relation comprises a beam, a spatial parameter, and/or a spatial domain filter. QCL state in this document can be used interchangeably with Transmission Configuration Indicator (TCI) state, which comprises one or more reference RSs and their corresponding QCL type parameters, such as Doppler spread, Doppler shift, delay spread, average delay, average gain, and spatial parameter (also referred to as spatial Rx parameter). The QCL state can include the following types:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

While discussions herein focus on sounding reference signals, the techniques can also be applied to procedures related to other types of reference signals, including channel state information reference signals (CSI-RS), synchronization signal block (SSB) (also referred to as SS/PBCH), demodulation reference signals (DMRS), sounding reference signals (SRS), or physical random access channel (PRACH). In particular, unlink (UL) signals comprises the sounding reference signals or other signals transmitted on the Physical Random Access Channel (PRACH), the Physical Uplink Control Channel (PUCCH), or the Physical Uplink Shared Channel (PUSCH). Downlink (UL) signals comprise CSI-RS, SSB, or other types of signals transmitted on the Physical Downlink Control Channel (PDCCH) or Physical Downlink Shared Channel (PDSCH). As mentioned above, a panel refers to an antenna group, an antenna port group, a beam group, a sub-array, a transmission entity/unit, and/or a reception entity/unit. A time unit can be a sub-symbol, a symbol, a slot, a sub-frame, a frame, a monitoring occasion, or a transmission occasion. Furthermore, "a guard period is excluded" is equivalent to "a guard period with the value of zero".

Embodiment 1

Figure 6:
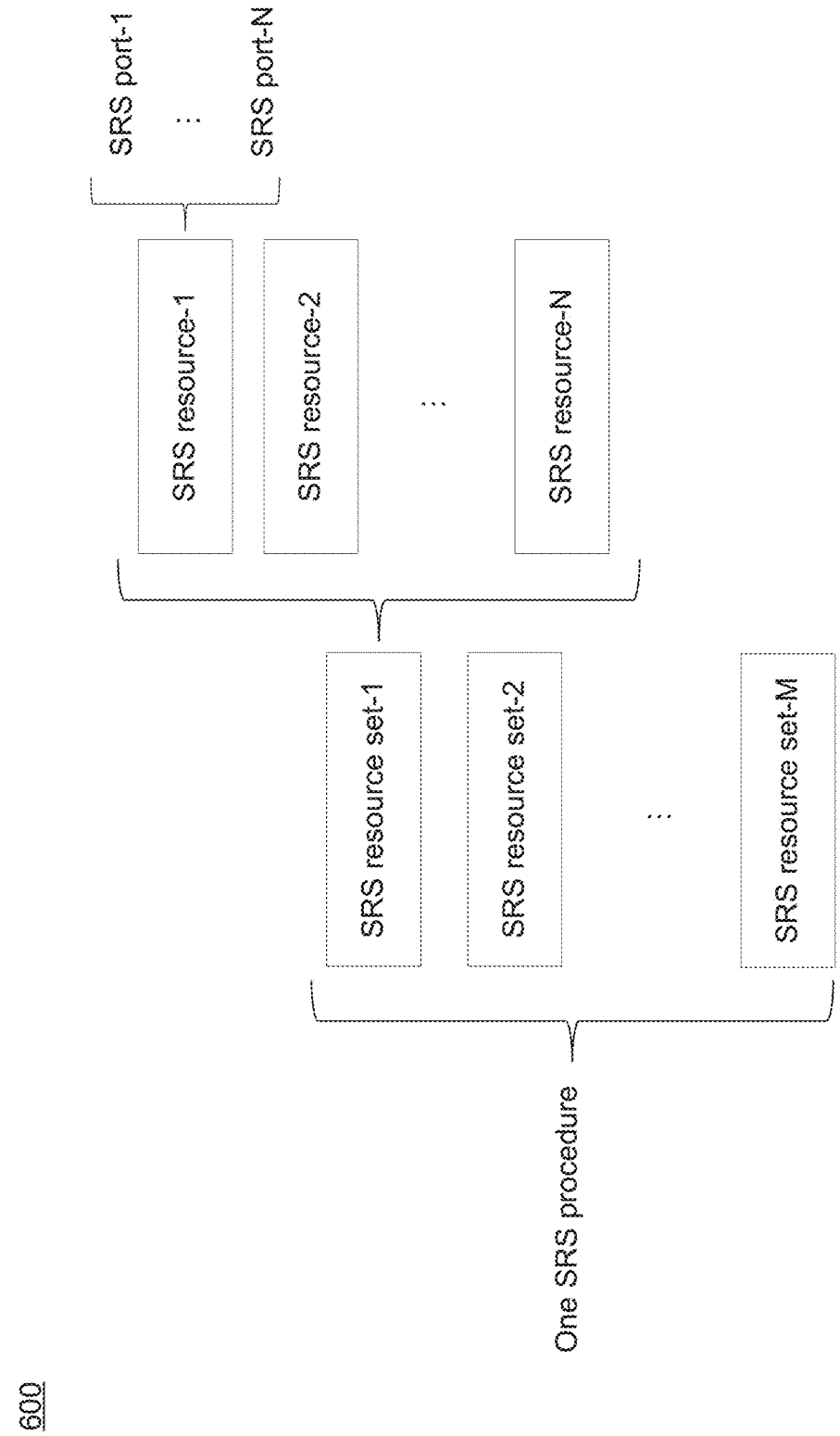
FIG. 6 illustrates an example of organizing SRS resources for an SRS procedure in accordance with the present technology.

The SRS resources can be organized in one or more resources sets. FIG. 6 illustrates an example 600 of organizing SRS resources for an SRS procedure in accordance with the present technology. An SRS procedure can use one or more SRS resource sets. Each of the resource set can include multiple SRS resources, and each of the SRS resources can have multiple configured ports or port groups. In some embodiments, the SRS resource sets can also be organized into one or more groups.

When the UE tries to establish a connection with a base station, the UE reports its capability, including SRS-related information. For example, the UE can indicate its capability for supporting different spatial relation(s), transmission state(s), and/or panel(s) in an SRS resource set and/or an SRS resource. In some embodiments, the number of different spatial relation(s), transmission state(s), and/or panel(s) is a predefined number. In some embodiments, the number of different spatial relation(s), transmission state(s), and/or panel(s) is a predefined number is also a UE capability. The UE can also indicate the number of different ports or port groups for the same spatial relation/same panel that it can support. Alternatively and/or additionally, the number of different ports or port groups under the same spatial relation/same panel is a pre-defined value.

The base station then sends SRS configuration information to the UE based on UE's capability. The configuration information can include one or more configuration parameters to configure the SRS resources and/or resource sets. After the UE receives the configuration information, the UE determines one or more SRS resource sets for an SRS procedure, e.g., for beam management, codebook transmission, non-codebook transmission, and/or antenna switching, according to the configuration information. The UE can make such determination based on an association of the one or more SRS resource sets (or the resources in the one or more SRS resource sets) indicated in the configuration information.

In some embodiments, the one or more resource sets are configured with a same indicator, such as a flag or a parameter index (e.g., procedureIndex). The UE can determine that the resource sets having the same indicator as associated for the same SRS procedure.

In some embodiments, the one or more resource sets are configured with a same transmission parameter or same transmission parameters. The transmission parameter comprises at least one of: a triggering state, time-domain behavior for the SRS, a resource type, a bandwidth part (BWP) indicator, a component carrier (CC) indicator, a transmission state indicator, spatial relation information, a panel indicator, or an antenna indicator such as "xTyR" where x and y are positive integers indicating the number of transmitting chains and receiving chains. For example, if one or more SRS resource sets are configured with the same resource type, same BWP/CC, same spatial relationship, and/or same antenna indicator (e.g., xTyR), the UE can determine that the one or more SRS resource sets can be used for an SRS procedure for the usage of antenna switching. As another example, one or more SRS resource sets are configured with the same time-domain behavior (e.g., semi-persistent), same BWP/CC, and the same panel. The UE can determine that the one or more SRS resource sets can be used for an SRS procedure for the usage of codebook or non-codebook transmission.

In some embodiments, a rule can be specified to associate the one or more SRS resource sets. For example, the rule can specify that SRS resource sets are associated for antenna switching when one or more of the following conditions are satisfied:

1. The SRS resource sets are configured with the same time-domain behavior.
2. Resources in the SRS resource sets are configured with the same number of SRS ports or port groups.
3. The SRS resource sets are configured to have the same number of SRS resources in each set.
4. The SRS resource sets are configured with the same triggering state(s).
5. The SRS resource sets are configured with the same antenna indicator. For example, the antenna indicator can be in the form of a parameter "xTyR", where x and y are positive integer indicating the number of transmitting chains and receiving chains.
6. The SRS resource sets are configured with the same spatial relation, same transmission state and/or same panel. The rule can further specify that the SRS ports or port groups of each SRS resource are associated with different UE antenna ports.
7. The SRS resource sets can be organized in multiple SRS resource groups. The SRS resource sets in a group have spatial relations. The rule can further specify that an SRS resource in a first group has the same spatial relation or transmission state as another SRS resource in a second group.
8. The SRS resource sets are configured with the same power control parameter. The rule can further specify that there is a same power control parameter for all SRS resource sets in a same panel.

Embodiment 2

From the UE perspective, different UE antenna ports and their relationship with SRS resources needs to be specified for antenna switching. To enable fast panel switching and/or antenna switching, the SRS ports/port groups of SRS resources can be associated with different UE antenna ports/port groups, even if the resources share the same spatial relation or transmission state. For example, referring back to FIG. 4A, two SRS resources can be configured to share the same spatial relation or transmission state (e.g., same beam indication). Yet the SRS ports/port groups of the two SRS resources are associated with different UE antenna ports/port groups (port A 404 and port B 405) to minimize any delay during the antenna switching (e.g., from port A 404 to port B 405).

In some embodiments, a rule can specify the mapping relationship between UE antenna port(s) and SRS resource(s), such as:

1. One or more resource sets are used for an SRS procedure; the SRS port(s)/port group(s) of each resource in the one or more resource sets are associated with different UE antenna ports.
2. Resources are configured with same spatial relation and/or same panel. The resources can be in the same resource set or different resource sets. The SRS port(s)/port group(s) of the resources are associated with different UE antenna ports/port groups.

In some embodiments, UE can report its capability with respect to the number of different UE antenna ports/port groups or the number of SRS resources having the same spatial relation and/or same panel. For example, the number of UE antenna ports/port groups with the same spatial relation/or same panel that the UE supports can be a predefined value (e.g., 2 or 4). As another example, the number of SRS resources with same spatial relation and/or same panel can also be a predefined value (e.g., 2 or 4). In some embodiments, the predefined value is determined based on an antenna indicator, e.g., xTyR. In some embodiments, the UE can report its capability with respect to the number of SRS resources having different spatial relations and/or different panels. Alternatively and/or additionally, the number of SRS resources having different spatial relations and/or different panels is a predefined value (e.g., 2 or 4).

Embodiment 3

Figure 7:
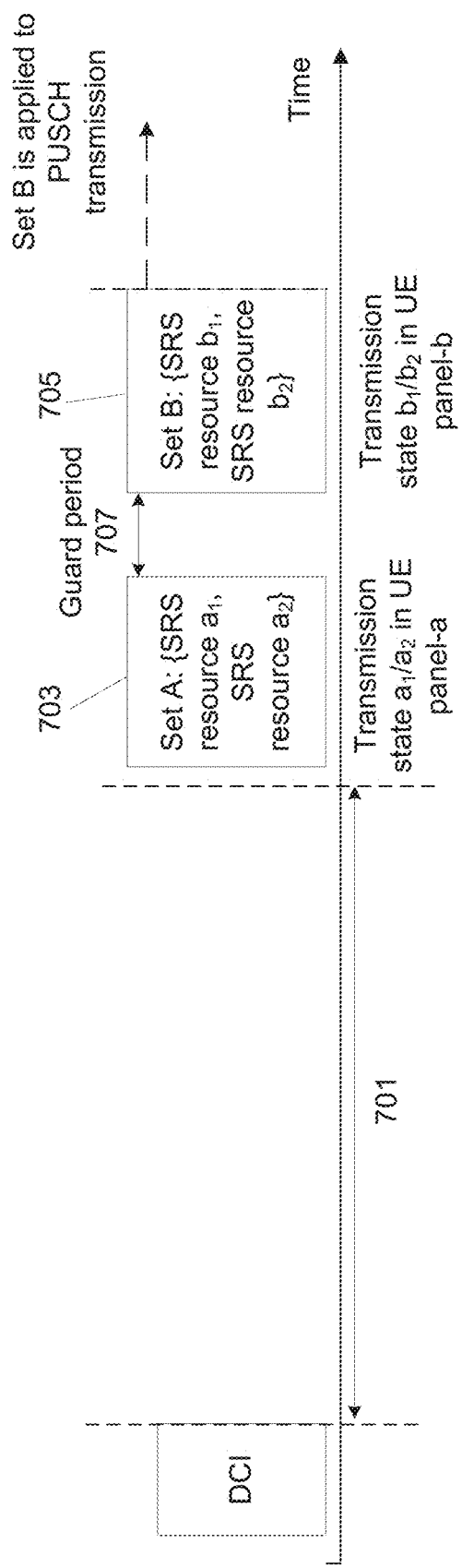
FIG. 7 illustrates an example of triggering an SRS procedure in accordance with the present technology.

After the base station sends configuration information to the UE, the base station can trigger an SRS procedure using a signaling message, such as a Downlink Control Information (DCI) message, or medium access control-control element (MAC-CE). FIG. 7 illustrates an example of triggering an SRS procedure in accordance with the present technology. As shown in FIG. 7, there is a time-domain offset 701 between the reception of the signaling message (e.g., DCI or MAC-CE message) by the UE and the initiation of the SRS procedure on the UE side. For intra-panel antenna switching, the triggering offset 701 can be relatively small. However, in inter-panel antenna switching, the target panel may be inactive so a larger offset is needed to allow the UE to activate the panel. In other words, the inter and intra-panel antenna switching can be distinguished according to the different triggering offsets.

In some embodiments, the trigger offset can be determined based on the UE's capability. For example, the UE can indicate that the minimum triggering offset of intra-panel antenna switching is a first value (e.g., 14 symbols when the resources correspond to a same panel with same transmission states/spatial relations). The UE can also indicate that the minimum triggering offset of inter-panel antenna switching is a second value (e.g., 224 or 336 symbols when the resources correspond to different panels with the different transmission state/spatial relation). Based on the UE's capability, the base station can configure the SRS resources and resource sets to be associated with different transmission states, spatial relations, or panels for inter-panel antenna switching, or with the same transmission state, spatial relation, or panel for intra-panel antenna switching.

Because the triggering offset for inter-panel antenna switching can be large due to the cost of activating the panel, some SRS resource sets can be used for multiple usages so as to reduce or minimize further delays in subsequent transmissions. In some embodiments, one or more resource sets corresponding to the last or first SRS transmission are associated with the usage of codebook or non-codebook transmission. That is, the SRS resources or resource sets that have the lowest or highest resource indices or set indices N are associated with the usage of codebook or non-codebook transmission, where N is a positive integer. The resources and/or resources sets that are associated with codebook or non-codebook transmission usage can be applied for subsequent uplink transmissions (e.g., PUSCH transmissions) to reduce or minimize further delay caused by the inter-panel antenna switching. In some embodiments, the SRS resources or resource sets that are associated with multiple usages are configured with the same panel, transmission state, or spatial relation.

For example, as shown in FIG. 7, a DCI message triggers an SRS procedure in which two SRS resource sets are used. The DCI message (or alternatively, a Medium Access Control, MAC, control element) can also dynamically provide the transmission state of resources within the two resource sets, which are associated with different UE panels. Resource set A 703 and resource set B 705 are configured with the usage of antenna switching. Resource set B 705 corresponds to the last SRS transmission, so it is also associated with the usage of codebook or non-codebook transmission that can be applied to subsequent PUSCH transmissions. When all the SRS transmissions are completed, the panel corresponding to the last SRS transmission remains active. The panel can continue to perform PUSCH transmissions using the most recent or active SRS transmission resources without incurring additional overhead.

In some embodiments, the UE can automatically update the mapping between SRS resource set(s) and UE panel(s) for an antenna switching transmission.

Embodiment 4

Referring back to FIG. 7, for inter-panel antenna switching (e.g., with physical radio frequency chain switching), in which the SRS resource or resource sets are associated with different panels, different transmission states, and/or different spatial relations, there can a time-domain guard period 707 between neighboring SRS transmissions, in which no signal is transmitted, to prevent transmission overlaps and/or interferences. The length of the guard period (e.g., Y symbols, where Y is a positive integer) can be determined based on UE capability or based on the subcarrier spacing of the transmission. For example, for antenna switching, a guard period can be inserted between adjacent resources within a resource set. As another example, for beam management, a guard period can be inserted between adjacent resource sets or adjacent resource groups, where the resource sets in each group are associated with the same panel(s).

For intra-panel antenna switching, the time-domain guard period may not be necessary. For example, there can be no time-domain guard period for beam switching at the same UE antenna port(s) and panel(s). When the SRS resource or resource sets are associated with the same panel (e.g., in a same SRS resource group) but have different spatial relations, there is no need to insert a guard period between adjacent guard period. When the SRS resource or resource sets are associated with the same panel and have the same spatial relation or transmission state, a guard period can be inserted between neighboring SRS transmissions to prevent transmission interferences. Similar to inter-panel antenna switching, the length of the guard period can be determined based on UE capability or based on the subcarrier spacing of the transmission.

Embodiment 5

This embodiment describes an intra-panel antenna switching without beam management (e.g., without beam sweeping). Referring back to FIG. 4A, the SRS resources or resource sets can be configured with the same spatial relation but different antenna ports for a procedure of antenna switching. As shown in FIG. 4A, SRS resource 411 and SRS resource 412 have the same spatial relation, but correspond to subarray A (antenna port A, 404) and subarray B (antenna port B, 405) respectively.

Embodiment 6

Figure 8:
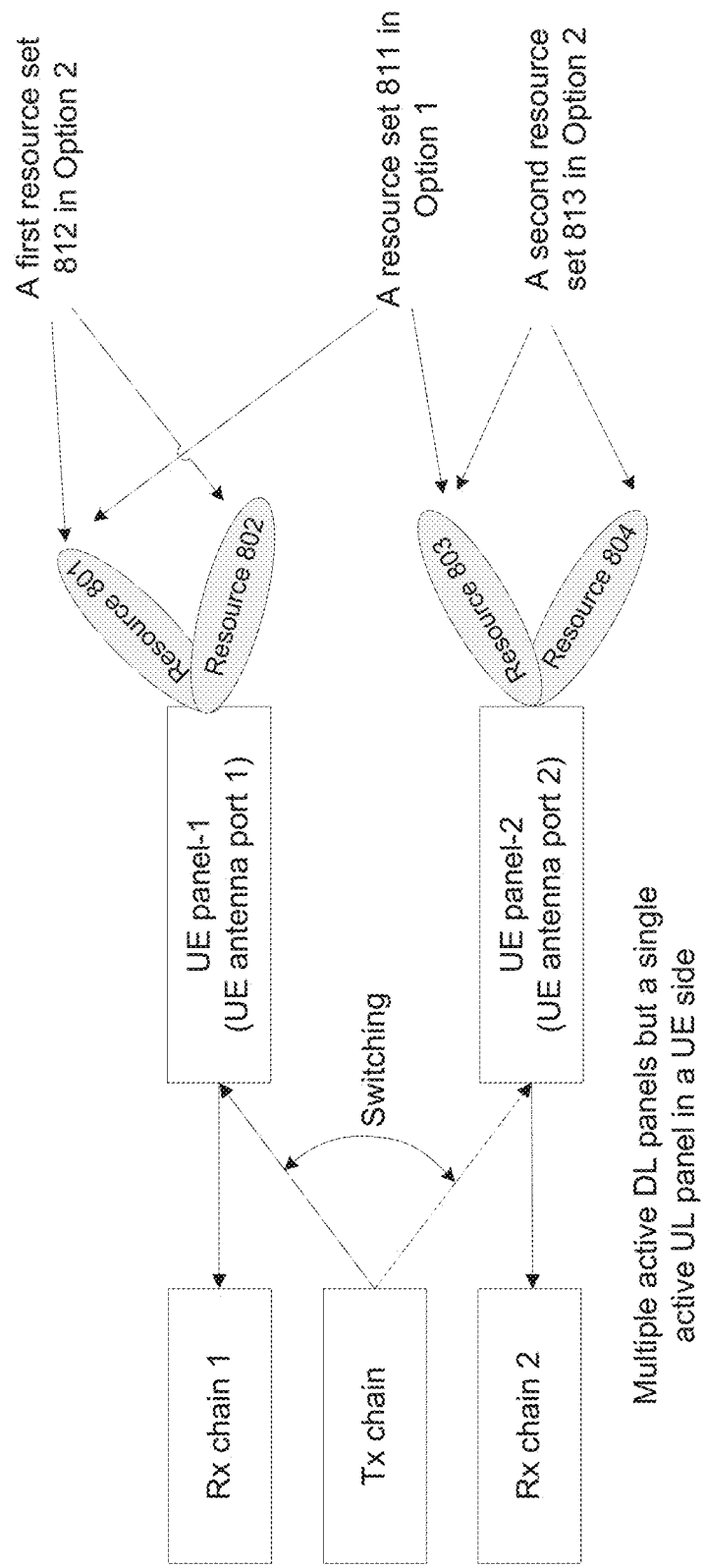
FIG. 8 illustrates an example of single-beam inter-panel antenna switching in accordance with the present technology.

This embodiment describes an example of inter-panel antenna switching with uplink beam management. FIG. 8 illustrates an example of single-beam inter-panel antenna switching in accordance with the present technology. In a single-beam antenna switching procedure with uplink beam management (e.g., UL beam sweeping), the following two options can be considered:

Option 1: An SRS resource set includes resources that correspond to different UE panels. In particular, at least one of the following criteria can be supported:

Criterion 1-1: The resources within the same resource set have the same spatial relation. For example, resource 801 and resource 803 are in the same resource set 811. They share the same spatial relation (e.g., beam indication). Resource sets that share the same spatial relation can also be organized into a group.

Criteria 1-2: In a resource set or a group of SRS resource sets, the SRS port/port group of resources are associated with different UE antenna ports. For example, resource 801 is associated with antenna port 1 of panel-1 while resource 803 is associated with antenna port 2 of panel-2.

Under option 1, because the resources correspond to different panels, there needs at least one guard period between/among resources within a group or a set of resources. To reduce the amount of guard periods needed, a resource-based slot offset (e.g., for each resource or for selected resource(s) in a set) can be adopted.

Option 2: An SRS resource set includes resources that correspond to the same UE panel. In particular, at least one of the following criteria can be supported:

Criterion 2-1: The SRS resources in a resource set have different spatial relations. For example, resource 801 and resource 802 are in the same resource set 812. Both resources correspond to the same panel (e.g., panel-1). In some embodiments, the resource sets can be ordered. An SRS resource in the first set have the same spatial relation or transmission state as a respective SRS resource in a second set in order. For example, resource set 812 is ordered prior to resource set 813. Resource 801 in resource set 812 have the same spatial relation (e.g., beam indication) as a respective resource 803 in resource set 813.

This criterion can be extended to multiple groups. When the SRS resource sets are organized into groups, SRS resources that are in a group of resource sets have different spatial relations. In some embodiments, the groups can be ordered. An SRS resource in the first group have the same spatial relation or transmission state as a respective SRS resource in a second group in order.

Criteria 2-2: The SRS ports/port groups of resources having the same spatial relation in different sets are associated with different UE antenna ports/port groups. For example, resource 801 is associated with antenna port 1 while resource 803 is associated with antenna port 2.

Under option 2, there is no need to insert guard periods between/among resources within the same resource set to mitigate interferences.

Embodiment 7

Figure 9:
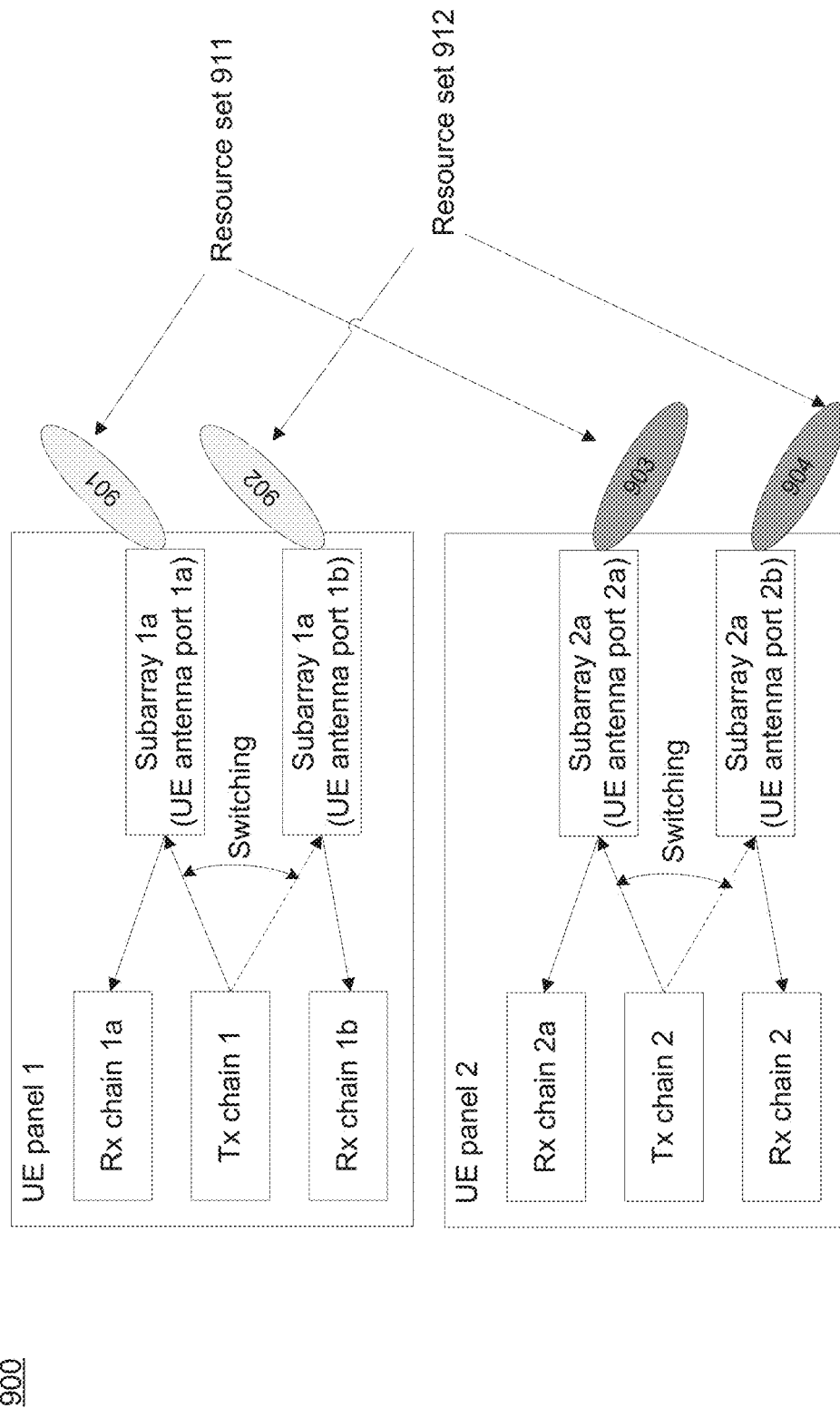
FIG. 9 illustrates an example multi-beam inter-panel antenna switching in accordance with the present technology.

As discussed above, considering downlink and uplink channel reciprocity, an antenna switching based on SRS procedure can also be used for DL-CSI acquisition. This embodiment describes another example of inter-panel antenna switching with uplink beam management. In a multi-beam antenna switching procedure with uplink beam management (e.g., UL beam sweeping), there are different transmission states/spatial relations (e.g., beam candidates) used for one DL-CSI acquisition in conjunction with the antenna switching. Consequently, the following two candidates can be considered:

Option 1: FIG. 9 illustrates an example multi-beam inter-panel antenna switching in accordance with the present technology. In FIG. 9, the UE has two panels, four Rx chains and two Tx chains (e.g., 2T4R). At least one of the following criteria can be supported:

Criterion 1-1: An SRS resource set includes resources that correspond to different UE panels and/or have different spatial relations. For example, resource set 911 includes resource 901 and 903 that correspond to panel 1 and panel 2 respectively. Resource 901 and 903 have different spatial relations (e.g., beam indications). Similarly, resource set 912 includes resource 902 and 904 that correspond to panel 1 and panel 2 respectively. Resource 902 and resource 904 have different spatial relations.

Criterion 1-2: The SRS ports/port groups of resources with same spatial relation, same transmission state, or same panel are associated with different UE antenna ports. For example, resources 901 and 902 have the same spatial relation (e.g., same beam indication). These two resources are associated with different antenna ports 1a and 1b. Similarly, resources 903 and 904 have the same spatial relation and they are associated with different antenna ports 2a and 2b.

Under option 1, the UE can report the maximum number of different spatial relations or panels in a resource set that it can support. Alternatively, the maximum number of different spatial relations or panels in a resource set can be set to a predefined value. The UE can also report the number of different UE antenna ports/port groups having the same spatial relation or panel that it can support. Alternatively, the number of different UE antenna ports/port groups having the same spatial relation or panel is set to a predefined value.

Figure 10:
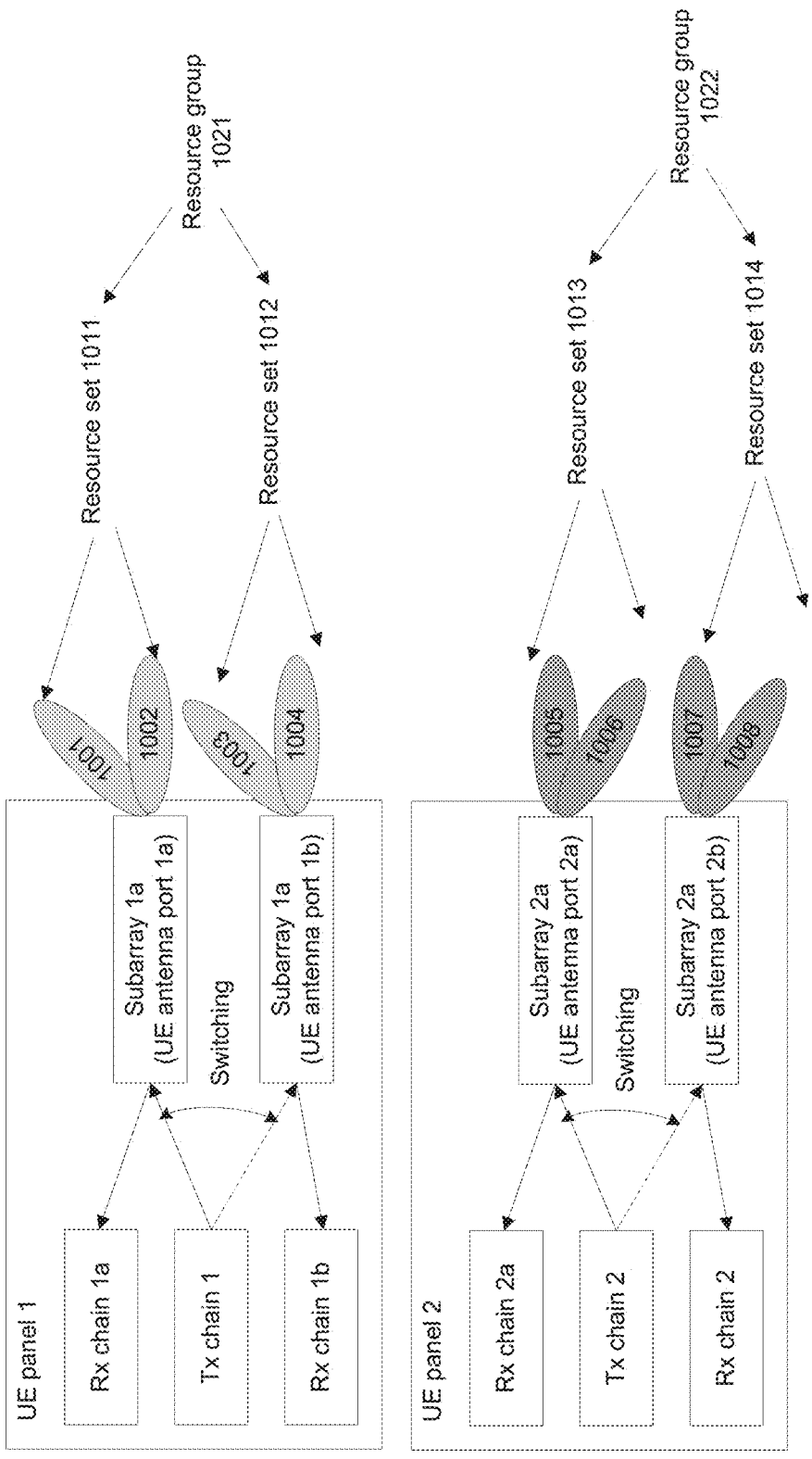
FIG. 10 illustrates another example multi-beam inter-panel antenna switching in accordance with the present technology.

Option 2: FIG. 10 illustrates another example multi-beam inter-panel antenna switching in accordance with the present technology. In FIG. 10, the UE also has two panels, four Rx chains and two Tx chains (e.g., 2T4R). At least one of the following criteria can be supported:

Criterion 2-1: Resources in the same resource group or resource set correspond to the same UE panel. For example, in FIG. 10, resources are organized in four resource sets 1011, 1012, 1013, and 1014. The four resource sets are then organized into two resource groups 1021 and 1022. In the same resource group 1021, resources 1001-1004 correspond to panel 1 but at least some of them have different transmission states/spatial relations. Similarly, in the same resource group 1022, resources 1005-1008 correspond to panel 2 but at least some of them have different transmission states/spatial relations. In some embodiments, a first resource (e.g., 1001) in a first resource set (e.g., 1011) or a first resource group (1021) has the same transmission state/spatial relation with a second resource (e.g., 1005) in a second resource set (e.g., 1013) or a second resource group (1022).

It is noted that when beam sweeping within a panel is not considered (similar to Embodiment 5 in which there is no beam management), the resource within a resource set or a resource group can be considered to have the same spatial relation.

Criterion 2-2: The SRS port/port pair of resources with the same spatial relation in a same SRS group or set are associated with different UE antenna ports/port groups. For example, in resource group 1021, resources 1001 and 1003 have the same spatial relation (e.g., same beam indication) but are associated with different UE antenna parts (port 1a and port 1b respectively). Similarly, in resource group 1022, resource 1005 and 1007 have the same spatial relation (e.g., same beam indication) but are associated with different UE antenna parts (port 2a and port 2b respectively).

Figure 11:
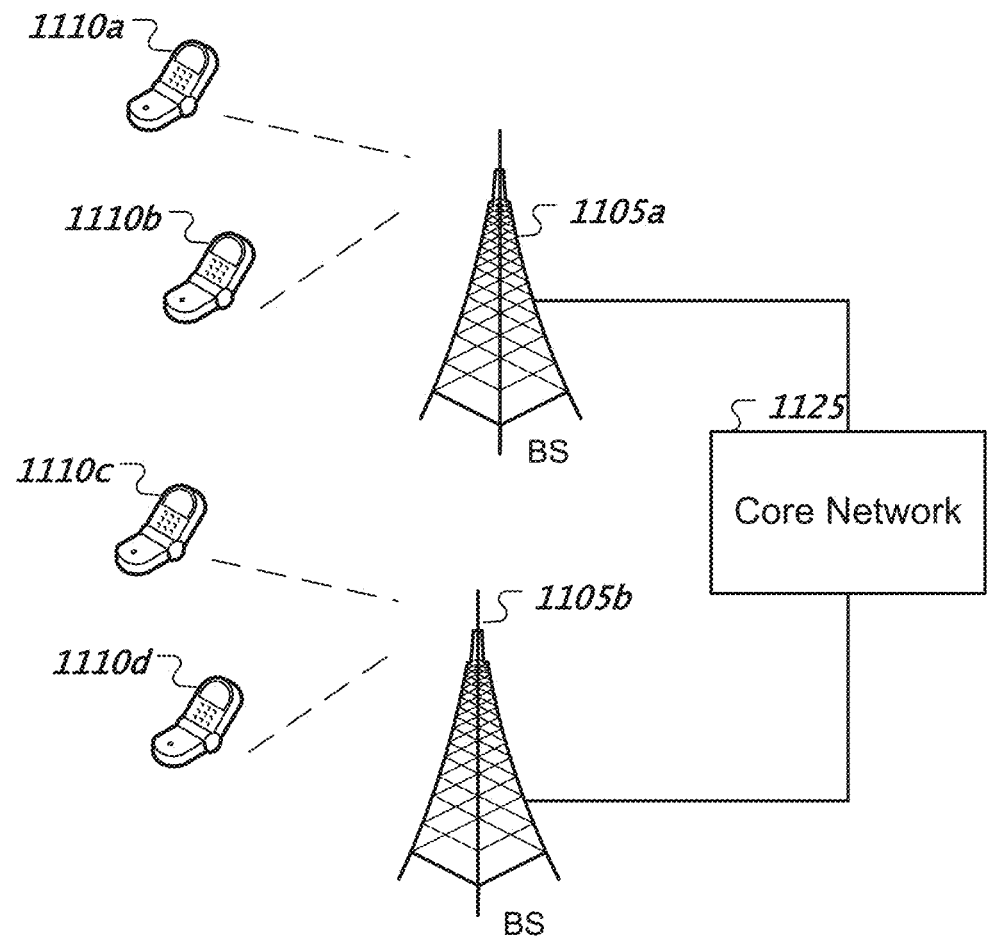
FIG. 11 shows an example of a wireless communication system where techniques in accordance with one or more embodiments of the present technology can be applied.

FIG. 11 shows an example of a wireless communication system 1100 where techniques in accordance with one or more embodiments of the present technology can be applied. A wireless communication system 1100 can include one or more base stations (BSs) 1105a, 1105b, one or more wireless devices 1110a, 1110b, 1110c, 1110d, and a core network 1125. A base station 1105a, 1105b can provide wireless service to wireless devices 1110a, 1110b, 1110c and 1110d in one or more wireless sectors. In some implementations, a base station 1105a, 1105b includes directional antennas to produce two or more directional beams to provide wireless coverage in different sectors.

The core network 1125 can communicate with one or more base stations 1105a, 1105b. The core network 1125 provides connectivity with other wireless communication systems and wired communication systems. The core network may include one or more service subscription databases to store information related to the subscribed wireless devices 1110a, 1110b, 1110c, and 1110d. A first base station 1105a can provide wireless service based on a first radio access technology, whereas a second base station 1105b can provide wireless service based on a second radio access technology. The base stations 1105a and 1105b may be co-located or may be separately installed in the field according to the deployment scenario. The wireless devices 1110a, 1110b, 1110c, and 1110d can support multiple different radio access technologies. The techniques and embodiments described in the present document may be implemented by the base stations of wireless devices described in the present document.

Figure 12:
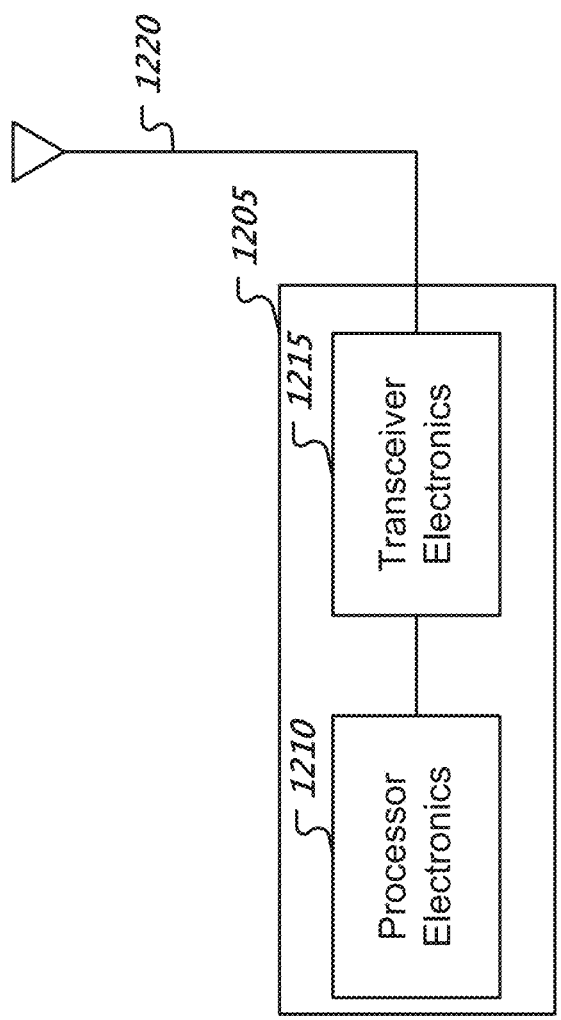
FIG. 12 is a block diagram representation of a portion of a radio station in accordance with one or more embodiments of the present technology can be applied.

FIG. 12 is a block diagram representation of a portion of a radio station in accordance with one or more embodiments of the present technology can be applied. A radio station 1205 such as a base station or a wireless device (or UE) can include processor electronics 1210 such as a microprocessor that implements one or more of the wireless techniques presented in this document. The radio station 605 can include transceiver electronics 1215 to send and/or receive wireless signals over one or more communication interfaces such as antenna 1220. The radio station 1205 can include other communication interfaces for transmitting and receiving data. Radio station 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the radio station 1205. In some embodiments, the radio station 1205 may be configured to perform the methods described herein.

It will be appreciated that the present document discloses techniques that can be embodied in various embodiments to allow fast panel switching and antenna switching for wireless devices that have multiple panels. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a mobile device, a configuration parameter from a base station; and
transmitting, by the mobile device, a sounding reference signal (SRS) to the base station according to an SRS procedure in which one or more resource sets are determined according to the configuration parameter,
wherein the configuration parameter comprises at least one of: a triggering state, a transmission state, or a spatial relation,
wherein at least one resource set of the one or more resource sets is used for a first usage and a second usage, the first usage including an antenna switching usage or a beam management usage, and the second usage including a codebook transmission usage or a non-codebook transmission usage,
wherein a subset of the one or more resource sets (a) is positioned at a beginning or an end of an SRS transmission or (b) has N lowest or N highest indices, the subset being applicable for an uplink data transmission, the codebook transmission usage, or the non-codebook transmission usage, wherein N is a positive integer, and
wherein a minimum value of a time-domain offset between a reception of a signaling message and an initiation of the SRS procedure equals a first threshold for intra-panel antenna switching and a second threshold, greater than the first threshold, for inter-panel antenna switching.

2. The method of claim 1, wherein the configuration parameter further comprises at least one of: a time-domain behavior, a number of antenna ports corresponding to resources in each of the one or more resource sets, a number of resources in each of the one or more resource sets, a resource type, a bandwidth part, a component carrier, a panel, a number of transmitting and receiving antennas, or a power control parameter.

3. The method of claim 1, further comprising:
receiving, by the mobile device, the signaling message from the base station for triggering the SRS procedure,
wherein, if resources of at least one of the one or more resource sets correspond to a same panel or a same transmission state, the time-domain offset for transmitting the sounding reference signal is less than or equal to the first threshold, and
wherein, if the resources of at least one of the one or more resource sets correspond to different panels or different transmission states, the time-domain offset for transmitting the sounding reference signal is more than or equal to the second threshold.

4. A method for wireless communication, comprising:
transmitting, by a base station, a configuration parameter to a mobile device; and
receiving, by the base station, a sounding reference signal (SRS) from the mobile device according to an SRS procedure in which one or more resource sets are determined according to the configuration parameter,
wherein the configuration parameter comprises at least one of: a triggering state, a transmission state, or a spatial relation,
wherein at least one resource sets of the one or more resource sets are used for a first usage and a second usage, the first usage including an antenna switching usage or a beam management usage, and the second usage including a codebook transmission usage or a non-codebook transmission usage,
wherein a subset of the one or more resource sets (a) is positioned at a beginning or an end of an SRS transmission, or (b) has N lowest or highest indices, the subset being applicable for an uplink data transmission, used for the codebook transmission usage, or used for the non-codebook transmission usage, and
wherein a minimum value of a time-domain offset between a reception of a signaling message and an initiation of the SRS procedure equals a first threshold for intra-panel antenna switching and a second threshold, greater than the first threshold, for inter-panel antenna switching.

5. The method of claim 4, wherein the configuration parameter further comprises at least one of: a time-domain behavior, a number of antenna ports corresponding to resources in each of the one or more resource sets, a number of resources in each of the one or more resource sets, a resource type, a bandwidth part, a component carrier, a panel, a number of transmitting and receiving antennas, or a power control parameter.

6. The method of claim 4, further comprising:
transmitting the signaling message to the mobile device for triggering the SRS procedure,
wherein, if resources of at least one of the one or more resource sets correspond to a same panel or a same transmission state, the time-domain offset for transmitting the sounding reference signal by the mobile device is less than or equal to the first threshold, and
wherein, if the resources of at least one of the one or more resource sets correspond to different panels or different transmission states, the time-domain offset for transmitting the sounding reference signal by the mobile device is more than or equal to the second threshold.

7. An apparatus for wireless communication comprising processor electronics and a memory storing instructions, execution of which by the processor electronics causes the apparatus to perform operations comprising:

receiving a configuration parameter from a base station; and transmitting, a sounding reference signal (SRS) to the base station according to an SRS procedure in which one or more resource sets are determined according to the configuration parameter, wherein the configuration parameter comprises at least one of: a triggering state, a transmission state, or a spatial relation, wherein at least one resource set of the one or more resource sets is used for a first usage and a second usage, the first usage including an antenna switching usage or a beam management usage, and the second usage including a codebook transmission usage or a non-codebook transmission usage, wherein a subset of the one or more resource sets (a) is positioned at a beginning or an end of an SRS transmission or (b) has N lowest or N highest indices, the subset being applicable for an uplink data transmission, the codebook transmission usage, or the non-codebook transmission usage, wherein N is a positive integer, and wherein a minimum value of a time-domain offset between a reception of a signaling message and an initiation of the SRS procedure equals a first threshold for intra-panel antenna switching and a second threshold, greater than the first threshold, for inter-panel antenna switching.

8. The apparatus of claim 7, wherein the configuration parameter further comprises at least one of: a time-domain behavior, a number of antenna ports corresponding to resources in each of the one or more resource sets, a number of resources in each of the one or more resource sets, a resource type, a bandwidth part, a component carrier, a panel, a number of transmitting and receiving antennas, or a power control parameter.

9. The apparatus of claim 7, wherein the operations further comprise:

receiving, by the apparatus, the signaling message from the base station for triggering the SRS procedure, wherein, if resources of at least one of the one or more resource sets correspond to a same panel or a same transmission state, the time-domain offset for transmitting the sounding reference signal is less than or equal to the first threshold, and wherein, if the resources of at least one of the one or more resource sets correspond to different panels or different transmission states, the time-domain offset for transmitting the sounding reference signal is more than or equal to the second threshold.

10. An apparatus for wireless communication comprising processor electronics and a memory storing instructions, execution of which by the processor electronics causes the apparatus to perform operations comprising:

transmitting a configuration parameter to a mobile device; and receiving a sounding reference signal (SRS) from the mobile device according to an SRS procedure in which one or more resource sets are determined according to the configuration parameter, wherein the configuration parameter comprises at least one of: a triggering state, a transmission state, or a spatial relation, wherein at least one resource set of the one or more resource sets is used for a first usage and a second usage, the first usage including an antenna switching usage or a beam management usage, and the second usage including a codebook transmission usage or a non-codebook transmission usage, wherein a subset of the one or more resource sets (a) is positioned at a beginning or an end of an SRS transmission or (b) has N lowest or N highest indices, the subset being applicable for an uplink data transmission, the codebook transmission usage, or the non-codebook transmission usage, wherein N is a positive integer, and wherein a minimum value of a time-domain offset between a reception of a signaling message and an initiation of the SRS procedure equals a first threshold for intra-panel antenna switching and a second threshold, greater than the first threshold, for inter-panel antenna switching.

11. The apparatus of claim 10, wherein the configuration parameter further comprises at least one of: a time-domain behavior, a number of antenna ports corresponding to resources in each of the one or more resource sets, a number of resources in each of the one or more resource sets, a resource type, a bandwidth part, a component carrier, a panel, a number of transmitting and receiving antennas, or a power control parameter.

12. The apparatus of claim 10, wherein the operations further comprise:

transmitting the signaling message to the mobile device for triggering the SRS procedure, wherein, if resources of at least one of the one or more resource sets correspond to a same panel or a same transmission state, the time-domain offset for transmitting the sounding reference signal by the mobile device is less than or equal to the first threshold, and wherein, if the resources of at least one of the one or more resource sets correspond to different panels or different transmission states, the time-domain offset for transmitting the sounding reference signal by the mobile device is more than or equal to the second threshold.

* * * * *